Jan. 30, 1962  G. J. J. HANSSENS  3,018,800
HOSE PIPES
Filed Oct. 25, 1955
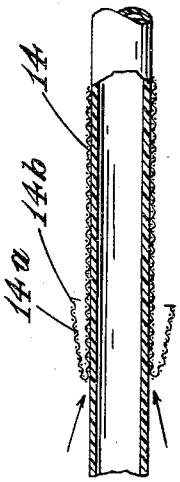
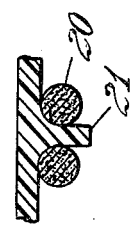
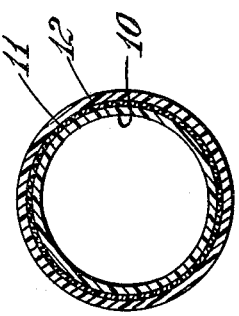
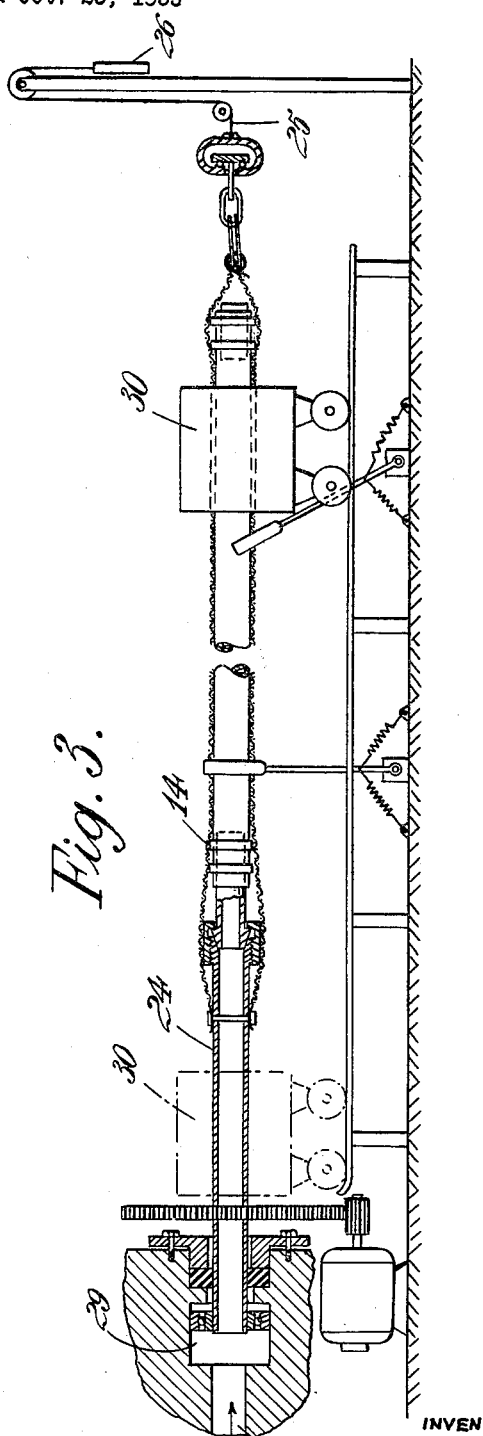
INVENTOR
G.J.J. HANSSENS
By
Watson, Cole, Grindle & Watson ATTORNEYS

United States Patent Office 3,018,800
Patented Jan. 30, 1962

3,018,800
HOSE PIPES
Gustave Jean Julien Hanssens, Forest, Brussels, Belgium, assignor to Plastidry Societe Anonyme, Brussels, Belgium, a Belgian body corporate
Filed Oct. 25, 1955, Ser. No. 542,674
Claims priority, application Great Britain Apr. 4, 1955
17 Claims. (Cl. 138—125)

The invention relates to flexible hose-pipes of the kind adapted to be coiled up in a flattened condition to facilitate transport and storage and comprising a textile tube having an impermeable lining and outer covering. The invention also relates to a method of manufacturing such hose-pipes.

Hose-pipes of the kind with which the invention is concerned are commonly employed as fire hoses but they may also be employed to convey water for other purposes such as drinking water to ships or for washing down. They may also be used for conveying fluids other than water.

It is important that hose-pipes of this kind should be capable of being coiled up in flattened condition without the folded edges of the flattened hose becoming fractured or cracked. It is also important that the hose-pipe retains its flexible properties for a long time and under conditions of heat and cold and is also capable of repeated flexure without deterioration.

One of the objects of the invention is to provide a method for the manufacture of a hose which fulfills these and other requirements in a particularly satisfactory manner. Another object is to provide an improved construction of hose.

According to the invention a method of making a flexible hose pipe capable of being rolled flat, comprises the steps of coating an artificial-fibre fabric tube inside and outside with a suspension, dispersion or solution of a thermoplastic polyvinyl compound, drying the fabric tube before or after the coating step to remove volatile liquids which will vaporize at the uniting temperature for the compound, inserting a tube composed of a thermoplastic polyvinyl compound into the fabric tube, placing a second tube composed of a thermoplastic polyvinyl compound on the outside of said fabric tube and applying heat and pressure to unit the three tubes through the medium of the coating of polyvinyl coating compound.

Preferably a polyvinyl chloride compound is employed for the coating, and it may be also for the inner and outer tubes. Other polyvinyl compounds may however be employed such as polyvinyl butyrate and co-polymers of a vinyl compound with at least one other polymerisable compound (e.g. a copolymer of vinyl chloride and vinylidene chloride). It is a feature of a preferred form of the invention that the compound used for coating the fabric has a melting or softening point which is lower than that of the inner tube.

It is also preferred that the fabric tube is impregnated, as far as is practicable, with the polyvinyl coating compound.

The pressure may be applied internally, for example by means of a pressure fluid. The tube may be supported during the application of the pressure by an external tube and it is a particularly important preferred feature of the method according to the invention that the support tube is of braided construction. The diameter of a braided tube can be varied by application of lengthwise tension and compression, which affords a particularly simple means for facilitating insertion and removal of the hose-pipe from the support tube. Thus during insertion the diameter is increased by compression of the braided tube, the diameter is decreased during the application of pressure and is increased to facilitate separation and removal of the hose-pipe after the pressure has been applied.

Alternatively the pressure may be applied externally while the tubes are supported on an internal mandrel.

The drying step forms an important feature of the invention. If the textile hose is wet (e.g. with absorbed moisture or with a volatile—at the heating temperature used—liquid employed as a solvent or suspension medium for the polyvinyl coating or impregnating compound) then the evaporation of the liquid caused by the heating step will tend to cause blisters between the tubes and imperfect adhesion between the tubes will result. Such imperfect adhesion reduces substantially the practical value and durability of the hose-pipe. In other words it is an important feature of the method according to the invention that it provides a continuous blister-free bond between the fabric tube and the inner and outer tubes.

If the coating or impregnating compound is applied as a paste or emulsion of the compound and a non-volatile plasticiser then it is preferred and sufficient to dry the fabric before application of the compound. If on the other hand the compound is applied in combination with a volatile liquid it will be necessary to dry after application of the compound and possibly also before the application.

The invention also provides a flexible hose-pipe capable of being rolled flat like a fire hose, comprising an artificial-fibre fabric tube, a thermoplastic polyvinyl compound lining tube and a thermoplastic polyvinyl compound cover tube, both the lining tube and the cover tube having continuous blister-free bonds to the fabric tube.

Preferably the fabric tube is mainly of rayon fibres, which may however contain up to 50% of other artificial fibres such as nylon being a polyamide material manufactured by Du Pont de Nemours, Wilmington, New Jersey, and Perlon being a polyamide material derived from Caprolactane and manufactured by successors of IG Farbenindustrien, Frankfurt am Main, Germany. Alternatively the tube may be mainly of fibres of a polyester such as that known as "Terylene," a polyester fiber manufactured by Imperial Chemical Industries, Wilton, North Yorkshire, England, or it may be mainly of a polyamide, such as that known as "nylon" which has been treated (e.g. by heating and setting) to reduce stretch.

The fabric tube may be woven and in one construction the weft extends circumferentially and consists of yarns which, individually are stronger than the individual warp yarn. A satteen or satin weave may be used for either or both surfaces of the fabric which is described, for instance, in Encyclopediae Britanica, 11 edition, 1911, vol. XXVIII, page 441.

It is preferred that the fabric is constructed to stretch, under internal pressure, to a greater extent in the circumferential direction than in the longitudinal direction. Thus it is desirable that the hose-pipe shall have little stretch in the longitudinal direction and that it shall have some measure of stretch in the circumferential direction for the purpose of reducing shock from changes in the water pressure. The fibres employed in the fabric and the method of weaving may be chosen or the fibres treated to provide this result. The permissible stretch in the circumferential direction may be about 12% at the maximum internal pressure.

It is to be understood that in order to obtain the necessary flexibility for flattening, the walls of the hose should be as thin as possible and the invention is primarily concerned with hoses of substantial diameter such as are commonly employed in fire fighting or for carrying drinking water to ships.

A specific example of the method according to the invention and of a hose-pipe produced by the method will now be described with reference to the accompanying diagrammatic drawings in which:

FIGURE 1 represents a cross-section through the hose-pipe the thicknesses of the several tubes being greatly exaggerated, FIGURE 2 is a diagram illustrating the locking effect of the gelled impregnation with the warp thread of the fabric, FIGURE 3 illustrates a further stage in the manufacture, and FIGURE 4 illustrates the removal of the support tube from the completed hose.

In the method according to the example, a length of woven textile tube, about three inches in diameter and about seventy-five feet long, is first thoroughly dried at an elevated temperature to remove moisture. The tube is then impregnated with an emulsion of polyvinyl chloride in a nonvolatile plasticiser. The impregnation is effected by filling say, five feet of one end of the tube with the emulsion paste and then progressively squeezing the emulsion under pressure along the tube by passing the tube between a pair of pressure rollers behind the emulsion. In this way, the paste is forced into the interstices of the fabric and, in so doing, replaces a considerable proportion of the air therein which assists in the final bonding. Any excess paste is finally squeezed out of the other end of the tube. If necessary or desirable the internal or external surface (or both) of the tube may be smoothed off after impregnation, by means of rollers or scrapers.

The tube in this example consists of rayon fibres with about 40% of nylon in the weft, which extends circumferentially. A satin weave is employed for both the internal and external surfaces. This form of weave assists in providing an effective mechanical bond with the polyvinyl chloride impregnation, the weave permitting the material to be forced between the warp threads 20 (see FIGURE 2) and to form stems 21 which resist removal.

After impregnation as above described, a closely fitting thin lining tube of plasticised polyvinyl chloride is threaded through the textile tube and the tubes are threaded through a closely fitting external cover tube of similar material.

In FIGURE 1, the lining tube is shown at 10, the impregnated textile tube at 11 and the cover tube at 12.

The nest of three tubes prepared as above described is threaded through a braided support tube 14 of wire or textile threads. As is usual with braided tubes, the diameter may be slightly varied by lengthwise extension or compression of the tube and in the present instance, the minimum internal diameter equals the external diameter of the cover tube. In assembling the tubes, the support tube is pushed over the nested tubes so that any frictional resistance to movement tends to compress the braided tube and so to increase the diameter and to reduce the resistance.

One end of the braided support tube 14 (containing the nest of tubes) is attached to a rotatable member 24 (FIGURE 3) and the other end of the braided tube is attached to a cable 25 to which a tension is applied by means of a weight 26. In this way the braided tube is tensioned and its diameter reduced to a minimum.

The ends of the nest of tubes (or at least the ends of the lining tubes) are sealed and compressed air is admitted from a source 28 through connection 29 to the inside of the lining tubes. The air, which is under substantial pressure, tends to expand the nest of tubes against the support tube.

A comparatively short (twelve feet) infra-red oven 30 is placed over the assembly of tubes and is gradually traversed along the assembly from one end to the other. At the same time the assembly is rotated about its axis by the means 24, thereby to secure deep and even heating of the assembly. This heating gels the polyvinyl-chloride impregnation and effects, in conjunction with the pressure, an effective bond between the impregnation and the lining and cover tubes. The tubes are heated to a temperature sufficient for this result without melting the lining tube. Long-wave infra-red heating is used.

After bonding of the tubes as just described, they are withdrawn as a unit from the braided support tube. This is effected by progressively turning the braided tube 14 inside out, from one end, as indicated in FIGURE 4, the outer layer 14a being pushed rather than pulled over the inner layer 14b to reduce binding of the layers.

In order to obtain an effective, blister-free bond between the several layers it is important to reduce as far as practicable, the evolution of gases and vapours during the heating step. As already stated, the fabric tube is dried before impregnation to remove moisture. If the impregnating material contains moisture or a volatile solvent or other component it may be necessary, or desirable, to dry after impregnation, with or without a preliminary drying step. It is also preferred to permit the escape of air, present in the interstices of the fabric and between the several tubes, as it expands on heating. To allow for such escape, the outer cover is perforated with small holes, say six or seven per square inch. The perforation is effected by passing the cover tube between a pair of rollers having radial pins at suitable spacing.

It is important that the heat employed to gel the impregnating material should not be such as to melt or unduly soften the lining tube, otherwise the internal pressure might rupture the tube. To enable this result to be obtained, the impregnating emulsion paste should have as low a gelling point as possible. With this end in view, a polyvinyl chloride having a low molecular weight is chosen for the paste. On the other hand, the lining tube should have a high melting point, and a polyvinyl chloride having a high molecular weight is chosen for the tube. The temperature differential is also increased by the use of suitable plasticisers. A low boiling point plasticiser such as dibutyl phthalate is preferably used for the impregnating paste and a high boiling point plasticiser such as dioctyl phthalate is preferably used for the tube. In order to improve the bond between the impregnating material and the inner and outer tubes it is further preferred to use a plasticiser and in the impregnating paste which is an active solvent for the material of the tubes. Dibutyl phthalate is suitable for this purpose. The plasticiser which is used for the lining tube should be chosen in relation to the fluids with which the hose is to be used and, in particular, should not be such as will be extracted by such fluids.

It is desirable to use a low molecular weight, low melting point polyvinyl chloride for the outer cover tube. Such an outer cover tube will melt and flow through the braided tube if excess heat is applied during the gelling operation, and so act as a visible warning indicator before damage is caused to the lining tube. Further, penetration of a cover tube through the braided tube before the melting point is reached, provides a guide to the temperature of the tubes.

It is an incidental advantage of the use of a comparatively short heating oven, as above described, that should excessive heat be used probably only a short length of hose will be rendered unusable.

Certain artificial fibres (e.g. poly-ester fibres such as those known as "Terylene" or poly-amide fibres such as those known as "nylon") normally stretch to too great an extent under tension for them to be suitable for use as fabric reinforcement for fire hoses. The stretch can be reduced by heat treatment while under tension, thereby rendering the fibres suitable for the purpose of the invention. This treatment may be effected as a preliminary operation but in carrying out the invention, when using fibres of this kind, it is preferred to arrange that the heating step which effects the gelling, also effects the treatment of the fibers. For this purpose it is important to ensure that the necessary tension is applied to the fibres, the air pressure and the relative dimensions of the several tubes, including the support tube, being chosen appropriately. Lengthwise tension is applied to the braided support tube as above described and is transmitted to the hose by the grip on the tubes of the hose.

It is preferred that the fabric is constructed to stretch, under internal pressure, to a greater extent in the circumferential direction than in the longitudinal direction in order to provide some measure of resilience for the absorption of rapid pressure changes without undue elongation of the hose. The fibres employed in the fabric and the method of weaving may be chosen or the fibres may be treated to provide this result. The permissible stretch in the circumferential direction may be about 12% at the maximum allowable internal pressure. Polyester fibres (Terylene) normally elongate about 12% before breaking and polyamide fibres (nylon) normally elongate about 25% before breaking. Accordingly, if, as is suitable, Terylene fibres are used, in the fabric, lengthwise of the hose (i.e. as warp) and nylon fibres are used circumferentially (i.e. as weft) the above-mentioned differential expansions can be obtained. It is to be appreciated in this connection, that, as above described, the stretch of the fibres used in the fabric may be reduced by the pressure and heat treatment so that it is comparatively simple to keep below the above-mentioned figure of 12% as the maximum permissible circumferential stretch bearing in mind also that the maximum allowable internal pressure is substantially below that which cause breaking of the fibres.

In cases where a minimum of stretch is desired glass fibres may be used for the fabric.

Some artificial fibres, especially the polyamide and poly-ester fibres, deteriorate under the influence of light (especially ultra-violet light) and to reduce this effect there may be added to the impregnating material an opacifier such as a metallic powder, e.g. aluminium powder, or a pigment such as titanium dioxide, or a mixture thereof. Alternatively, or in addition, the opacifier may be incorporated in the cover tube.

A further advantage of the addition of an opacifier such as aluminium powder or titanium dioxide is that it reflects heat so that in use under fire conditions or other conditions of high temperature, the rise in temperature of the cover tube is lessened. Further, aluminium powder assists in conducting the heat to the internal water and for this purpose the powder may also be incorporated in the lining tube.

Various modifications may be made in the above example. For instance the fabric tube and the lining tube may be bonded together without an outer cover tube and an outer cover applied subsequently either as a liquid coating or by wrapping sheet material around the fabric tube and securing, for example by adhesive or by the use of heat and pressure, to effect a bond with the impregnating material.

Other heating means, such as circulation of a heated pressure fluid through the lining tube may be used.

In order to protect the end of the fabric tube, the end edges of the hose-pipe may be covered with an extra layer of thermoplastic material or the ends of the hose may be turned back and covered with an extra layer of thermoplastic material.

It is important that, for fire hoses, the outer cover at least should be of a material which is self-extinguishing (i.e. if ignited it should not continue to burn in the absence of further ignition).

The several tubes should be as thin as possible—consistent with the strength necessary to permit manipulation and, in the final hose, to withstand the internal pressure in use.

The hose-pipes provided by the invention have many practical advantages. They are impermeable to water so that they do not leak and do not require an elaborate drying technique after use. They have smooth internal walls, are light and resistant to wear. The complete bond between the several layers ensures a long life. The fabric tube provides adequate strength with little weight. The rayon or other fibres are fully protected against water.

As an alternative to the use of internal fluid pressure to secure bonding of the layers, as above described, external pressure may be employed. Thus the nested tubes may be supported on an internal mandrel and external pressure applied by contracting a braided outer tube onto the nest of tubes.

I claim:

1. A method of making flexible hose pipe capable of being rolled flat, which comprises the steps of impregnating an artificial-fibre fabric tube throughout with a mixture of a thermoplastic polyvinyl compound, drying the fabric tube during an independent step of the method to remove volatile liquids which will vaporise at the uniting temperature of the compound, applying at least one tube composed of a thermoplastic polyvinyl compound to the impregnated fabric tube and applying heat and pressure to unite the impregnated fabric and the thermoplastic polyvinyl tubes through the medium of the polyvinyl impregnating compound.

2. A method of making flexible hose pipe capable of being rolled flat, which comprises the steps of impregnating an artificial-fibre fabric tube inside and outside with a mixture of a thermosplastic polyvinyl compound with a plasticizer therefor, drying the fabric tube during an independent step of the method to remove volatile liquids which will vaporise at the uniting temperature for the compound, inserting a tube composed of a thermoplastic polyvinyl compound into the fabric tube, placing a second tube composed of a thermoplastic polyvinyl compound on the outside of said fabric tube and applying heat and pressure to unite the three tubes through the medium of the impregnation of polyvinyl compound.

3. The method according to claim 2 in which a polyvinyl chloride compound is employed for the impregnation.

4. The method according to claim 2 in which a co-polymer of a vinyl compound with at least one other polymerisable compound is employed for the impregnation.

5. The method according to claim 2 in which the pressure is applied internally.

6. The method according to claim 5 in which fluid pressure is employed.

7. The method according to claim 2 including the steps of assembling the three tubes within an external support tube of flexible braided construction, applying the aforesaid pressure internally and then removing the support tube.

8. The method according to claim 2 in which the fabric tube is impregnated by filling a portion of the fabric tube with a paste of the thermoplastic compound and then pressing together the walls of the tube behind the paste progressively along the tube to squeeze the paste along the tube ahead of the walls as they are pressed together.

9. The method according to claim 2 and including the step of perforating the outer tube before the tubes are united.

10. The method according to claim 2, in which the fabric tube is woven of fibers, stretched and set by the use of heat and pressure to give the fabric dimensional stability.

11. The method according to claim 2 in which the pressure is applied externally by contraction of a braided tube around the hose-pipe and the hose-pipe is supported internally on a mandrel during the application of the external pressure.

12. The method according to claim 2 in which prior to applying the heat of the last named heating step to the tubes, the three preformed nested tubes are stretched between their ends and a heating source is moved along the tubes from one end thereof to the other end.

13. The method according to claim 12 in which the

14. A flexible hose pipe, capable of being rolled flat as a fire hose, comprising a seamlessly woven tubular fabric consisting of warp threads and weft threads of at least one artificial fibrous material, and extending longitudinally and circumferentially respectively relative to said hose pipe, said circumferentially extending threads having a stretch under tensile load greater than that of the longitudinally extending threads, a layer of solidified thermoplastic material, embedding said woven fabric and filling the interstices between said warp threads and said weft threads, and at least one layer of a preformed seamless extruded tube of a thermoplastic polyvinyl compound being fusedly connected to, and forming a continuous, blister free bond with, said layer of solidified thermoplastic material embedding said woven fabric.

15. A flexible hose pipe, capable of being rolled flat as a fire hose, comprising a seamlessly woven tubular fabric consisting of warp threads and weft threads of at least one artificial fibrous material, and extending longitudinally and circumferentially respectively relative to said hose pipe, said circumferentially extending threads having a stretch under tensile load greater than that of the longitudinally extending threads, a layer of solidified thermoplastic material embedding said woven fabric and filling the interstices between said warp threads and said weft threads, an internal lining tube of a preformed seamless extruded tube of a thermoplastic polyvinyl compound being fusedly connected to, and forming a continuous, blister-free bond with, said layer of solidified thermoplastic material embedding said woven fabric, and an external cover tube of a thermoplastic polyvinyl compound embodying an opacifier so as to make said cover tube impervious to ultraviolet light.

16. A hose-pipe as claimed in claim 15 in which the threads extending longitudinally are composed of a polyester.

17. A hose-pipe as claimed in claim 16 in which the threads extending circumferentially are composed of a polyamide.

References Cited in the file of this patent

UNITED STATES PATENTS

| Number | Name | Date |
|---|---|---|
| 2,053,112 | Schnabel | Sept. 1, 1936 |
| 2,146,559 | Berkowitz | Feb. 7, 1939 |
| 2,160,371 | Schnabel | May 30, 1939 |
| 2,171,764 | Ramsdell | Sept. 5, 1939 |
| 2,308,343 | Wilkinson et al. | Jan. 12, 1943 |
| 2,329,836 | Huthsing | Sept. 21, 1943 |
| 2,362,881 | Canney et al. | Nov. 14, 1944 |
| 2,431,056 | Loudenslager et al. | Nov. 18, 1947 |
| 2,461,594 | Flounders | Feb. 15, 1949 |
| 2,512,433 | Leben | June 20, 1950 |
| 2,590,221 | Stevens | Mar. 25, 1952 |
| 2,645,249 | Davis et al. | July 14, 1953 |
| 2,652,093 | Burton | Sept. 15, 1953 |
| 2,653,887 | Slayter | Sept. 29, 1953 |
| 2,690,769 | Brown | Oct. 5, 1954 |
| 2,706,699 | Planseon et al. | Apr. 19, 1955 |
| 2,749,943 | Nemeth | June 12, 1956 |
| 2,752,952 | Dauphinais | July 3, 1956 |
| 2,763,316 | Stahl | Sept. 18, 1956 |
| 2,766,160 | Bentor | Oct. 9, 1956 |
| 2,783,174 | Stephen | Feb. 26, 1957 |
| 2,792,324 | Daley et al. | May 14, 1957 |

FOREIGN PATENTS

| Number | Country | Date |
|---|---|---|
| 549,902 | Great Britain | May 6, 1942 |
| 557,897 | Great Britain | Aug. 25, 1943 |
| 719,638 | Great Britain | Dec. 8, 1954 |
| 737,216 | Great Britain | Sept. 21, 1955 |